United States Patent [19]

Sugiura

[11] Patent Number: 5,068,913
[45] Date of Patent: Nov. 26, 1991

[54] IMAGE READER WITH PLATEN CRITERIAL MARK FOR DETERMINING DOCUMENT SCAN START

[75] Inventor: Masamichi Sugiura, Osaka, Japan

[73] Assignee: Minolta Camera Kabushiki Kaisha, Osaka, Japan

[21] Appl. No.: 598,784

[22] Filed: Oct. 17, 1990

Related U.S. Application Data

[63] Continuation of Ser. No. 216,194, Jul. 7, 1988, abandoned.

[30] Foreign Application Priority Data

Jul. 8, 1987 [JP]  Japan ................................ 62-171767

[51] Int. Cl.⁵ .......................... G06K 9/20; G06K 7/10; G06K 7/20
[52] U.S. Cl. ........................................ 382/61; 382/65; 358/449; 358/453
[58] Field of Search ...................... 382/50, 51, 52, 53, 382/60, 61, 62, 63, 65; 358/449, 453, 484

[56] References Cited

U.S. PATENT DOCUMENTS

| | | | |
|---|---|---|---|
| 4,086,478 | 4/1978 | Okano | 235/466 |
| 4,153,895 | 8/1989 | Weisbrod et al. | 382/52 |
| 4,357,596 | 11/1982 | Feilchenfeld | 235/436 |
| 4,384,272 | 5/1983 | Tanaka et al. | 382/50 |
| 4,411,016 | 8/1989 | Wakeland | 382/62 |
| 4,420,742 | 12/1983 | Tadauchi et al. | 340/347 |
| 4,471,386 | 9/1984 | Tuhro | 358/453 |
| 4,517,606 | 5/1985 | Yokomizo et al. | 358/280 |
| 4,528,692 | 8/1985 | Umeda et al. | 382/9 |
| 4,558,374 | 12/1985 | Kurata | 358/453 |
| 4,763,200 | 8/1988 | Nakatani et al. | 358/282 |
| 4,823,395 | 8/1989 | Chikauchi | 382/63 |

FOREIGN PATENT DOCUMENTS 55-55658  4/1980  Japan .
58-172061 10/1983  Japan .
58-184160 10/1983  Japan .

Primary Examiner—Leo H. Boudreau
Assistant Examiner—Michael R. Cammarata
Attorney, Agent, or Firm—Burns, Doane, Swecker & Mathis

[57] ABSTRACT

An image reader which has a criterion member arranged at the upstream side of a platen with respect to the subscan direction and controls a scanner so as to scan the criterion member and subsequent thereto the document. The criterion member is used to determine a reference edge from which the image reading of the document should be started.

17 Claims, 6 Drawing Sheets

IMAGE READER WITH PLATEN CRITERIAL MARK FOR DETERMINING DOCUMENT SCAN START

This application is a continuation of application Ser. No. 07/216,194, filed July 7, 1988, now abandoned.

FIELD OF THE INVENTION

The present invention relates to an image reader wherein a document is read with an image sensor.

BACKGROUND OF THE INVENTION

In an image reader, a document which should be read by an image sensor is placed on a platen glass of an image reader and is covered with a document cover. The document is illuminated by a light source, and the density of a line on the document, that is, the light reflected from the line on the document is detected by a one-dimensional image sensor (main scan). The density is converted to digital data by an analog-to-digital converter, and after correcting the shading thereof, the digital data are binarized according to a predetermined processing. Then, the binarized data are stored in a memory. Then, the image sensor scans a next line of the document (subscan). By scanning all lines on the document, an image of the document is read out.

In a subscan of a document, the starting point of the subscan should be determined. For example, a switch is set at the top of a document region where a document may exist, and the starting point of the subscan is determined as the moment that the switch is switched on due to the movement of the optical system. In another method, a switch is set at a fixed point, and the starting point is determined as the timing at which a predetermined time interval has lapsed from the moment that the switch was closed. In those methods, however, the starting point can not be determined accurately unless the switch is mounted with a high precision.

In an image reader disclosed in Japanese Examined Patent Publication No. 28182/1985, two movable markers are set along an edge of the platen glass in the subscan direction at the starting point and at the end point of the subscan, respectively. The markers have a color of a predetermined reflection density. The start and the end of the reading are controlled by detecting images of the markers. However, this method requires a setting mechanism for the markers, and the positions of the markers should be controlled each time.

SUMMARY OF THE INVENTION

Accordingly, an object of the present invention is to provide an improved image reader capable of processing with faster speed.

Another object of the present invention is to provide an image reader which can conduct the detection of the reference edge from which the document scanning is to be started as well as the image processing in which the document image is read and sent to the exterior through one scanning movement of the scanner.

These and other objects are accomplished by an image reader comprising;

a platen on which a document can be placed; a criterion member on which at least one black zone and at least one white zone are formed successively in the subscan direction, said criterion member being arranged near the platen on the side from which a subscan is started; means for detecting a linear optical image of the document to obtain a density distribution of a linear optical image; means for scanning the criterion member and the document in the subscan direction, said means including means for illuminating a document placed on a document area of the platen and the criterion member; means for determining a reference timing for starting a scan for the document on the platen, said means being connected to said means for detecting a linear optical image so as to detect a boundary between the black and white zones and determining the reference timing from the detected boundary; and means responsive to the arrival of the reference timing for starting an image reading process, in which a image data is read and sent out to the exterior, in succession to the reading of the criterion member.

DESCRIPTION OF PREFERRED EMBODIMENTS

Figure 1:
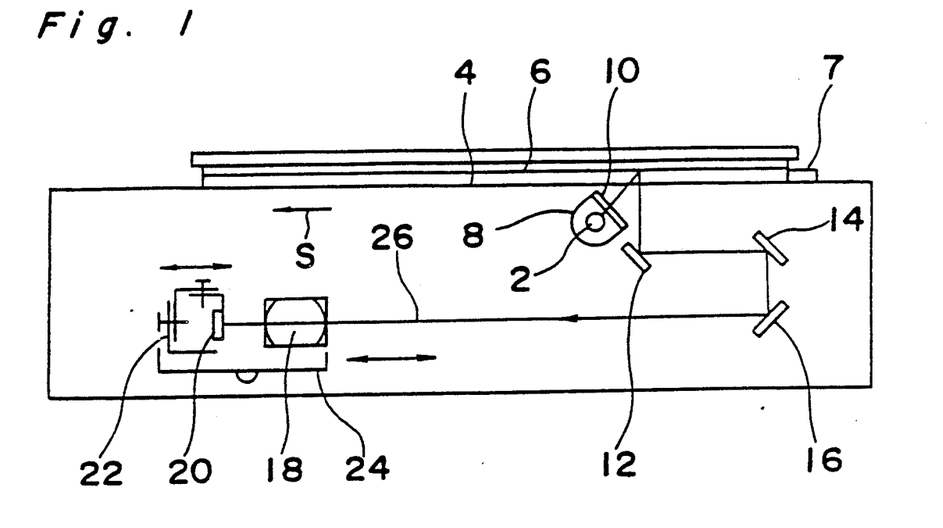
FIG. 1 is a schematic cross-section of an image reader.

Referring now to the drawings wherein like reference characters designate corresponding parts, an embodiment of an image reader according to the present invention will be explained in a following order:

a. image reader
b. operation of scan
c. detection of the top edge of pattern
d. detection of image area (a) Image reader FIG. 1 shows a schematical sectional view of an image reader. A light source for exposure illuminates a document 6 placed on a glass platen 4 along a plate 7 for a document scale. Document scale 7 is arranged at the upstream side of the platen 4 in the subscan direction. The light source consists of a halogen lamp 2, a concave mirror 8 and an infrared filter 10.

The light reflected from the document 6 is reflected successively in a scan system or a scanner which comprises a first mirror 12, a second mirror 14 and a third mirror 16. Then, it is transmitted finally on a one-dimensional charge-coupled device (image sensor) 20 through an optical lens assembly 18.

The one-dimensional charge-coupled device (hereinafter referred to as CCD) 20 is held by a CCD holder 22. The CCD holder 22 and the lens assembly 18 are mounted on a carriage 24.

The reading magnification of an image of the document 6 can be varied continuously by moving the carriage 24 along the direction of the optical axis 26 of the lens 18 by using a motor (not shown).

The focusing can be controlled by moving CCD 20 along the direction of the optical axis 26 by using a motor (not shown) mounted to the carriage 24.

As is well known, on scanning the document 6, the light source 2,8,10 and the first mirror 12 are moved integrally in a direction of an arrow S at a velocity V, while the second and third mirrors 14, 16 are moved integrally in the direction of an arrow S at the velocity of ($\frac{1}{2}$)V, in order to keep the length of the optical path constant.

In this embodiment, a reduction optical system with CCD 20 is used, while a CCD of contact type (equal magnification type) may also be used.

Figure 2:
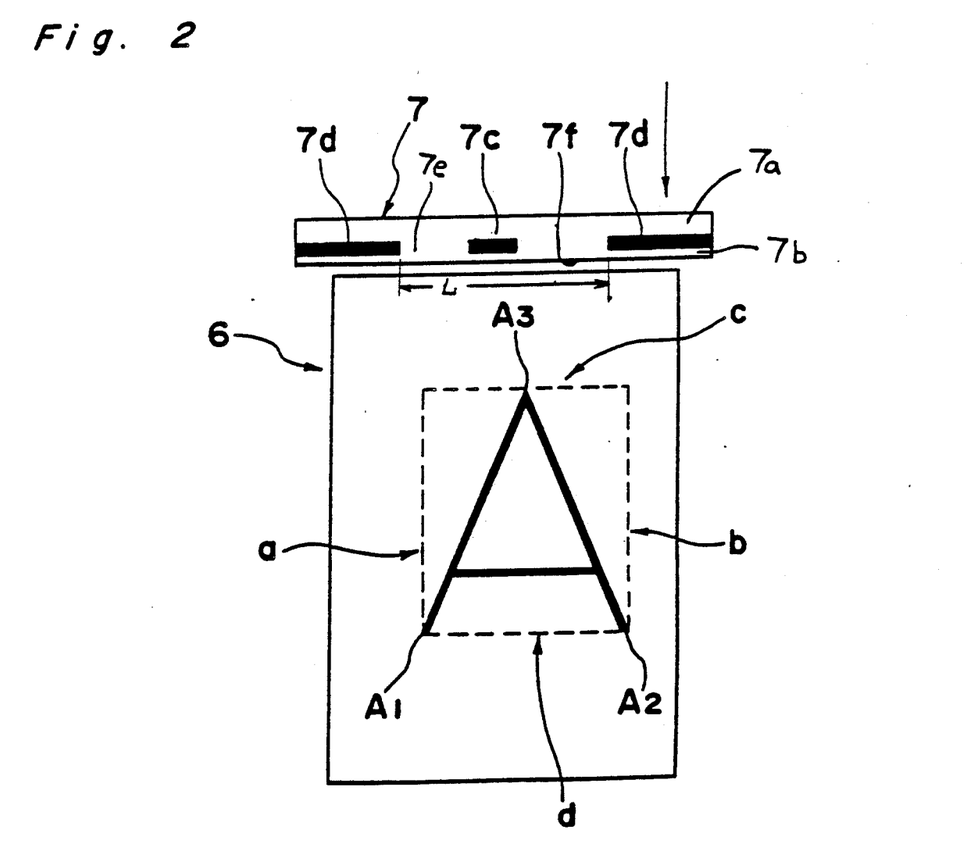
FIG. 2 is a diagram which shows a criterion member and a document for explaining the detection of the reference edge and an actual image area on the document.

FIG. 2 shows a pattern which is formed on the rear surface of the plate 7 for a document scale and a document placed along the plate 7. The upper half 7a of the pattern is white and is used for the correction of the shading. At the center of the lower half 7b of the pattern a black pattern 7c for the detection of the reference edge 7f of the plate 7 (or the top of the document area on the platen 4) is drawn, while at the both sides thereof a pair of black patterns 7d are formed symmetrically with respect to the center. The distance L between the edges of the patterns 7d yields a standard distance for the setting of the magnification. The remaining part 7e is white.

Figure 3:
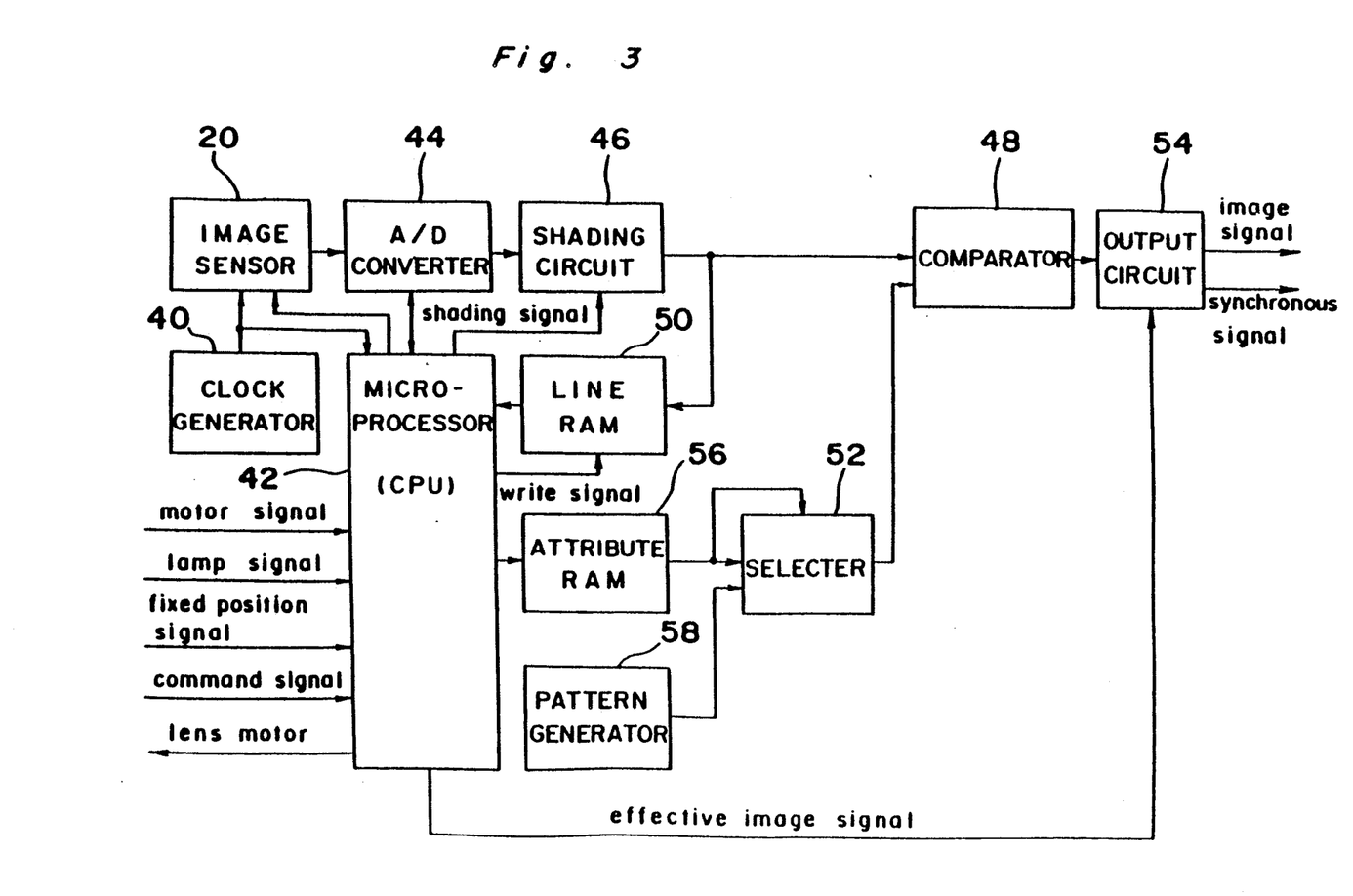
FIG. 3 is a block diagram of an electric circuit of the image reader.

FIG. 3 shows a block diagram of a circuit which can detect the density distribution of an image on a document. A clock generator 40 gives clock signals to a microprocessor (CPU) 42 and sample-hold (SH) signals to an image sensor (CCD) 20 for transforming light signals of the image into electric signals, and the output level of the CCD 20 is controlled by a signal from CPU 42. An analog-to-digital (A/D) converter 44 transforms the analog output signals of the image sensor 20 into digital signal data, and the conversion level thereof is controlled by a signal from CPU 42. A shading circuit 46 corrects the variation of the intensity of light in the direction of the main scan as well as the scattering characteristics of the elements of CCD 20. The timing of the correction is given by CPU 42. The output signal of the shading circuit 46 is sent to a comparator 48 and a line RAM 50. CCD 20 consists of, for example, 2048 elements. They are aligned linearly in the direction of the main scan so that the light from a long but narrow line of an image can be received and can be integrated in the elements at the same time during a period determined by SH signals. In the next period, the charges in the elements are transferred to registers in parallel and they ar read out successively (this process is called main scan).

The data thus scanned are stored in the line RAM 50. In the same period, the scan system moves by one line in the direction perpendicular to that of the main scan (this process is called subscan), and the light is newly integrated in the elements. This procedure is repeated successively from the pattern area to the bottom of the area of the platen 4.

The comparator 48 compares the image signal corrected by the shading circuit 46 with the signal selected by a selector 52, and the resultant 1-bit output signal is sent to an output circuit 54. The output circuit 54 sends both the 1-bit image signal and the effective image signal (synchronizing signal) received from CPU 42 to an external apparatus 60 such as a printer. The effective image signal indicates that the image signal is of an actual image area.

A line RAM 50 stores the signals of one main scan corrected by the shading circuit 46 according to a write signal received from CPU 42. CPU 42 gets the image data of one scan with access to the line RAM 50. Attributes stored in an attribute RAM 56 includes an attribute of bi-level or dither which has been determined by CPU 42 from the data written in the line RAM 50. The attribute data are used by a selector 52 at the transfer (or main scan) of the image signal in a main scan.

A pattern generator 58 generates a threshold value when the attribute is dither, and the threshold value is generated from a matrix (m×n). The selector 52 determines a threshold data to be sent to the comparator 48 in accordance with the attribute data. That is, when the attribute is dither, the selector 52 sends the data received from the pattern generator 58 to the comparator 48, while when the attribute is bi-level, it sends a threshold data received from the attribute RAM 56. CPU 42 controls all the circuits based on the above-mentioned signals, the motor signal, the lamp signal and the fixed position signal.

On reading an image on a document, the output level of the image signal and the shading are corrected before a scan of a document.

(b) Operation of Scan

Figure 4:
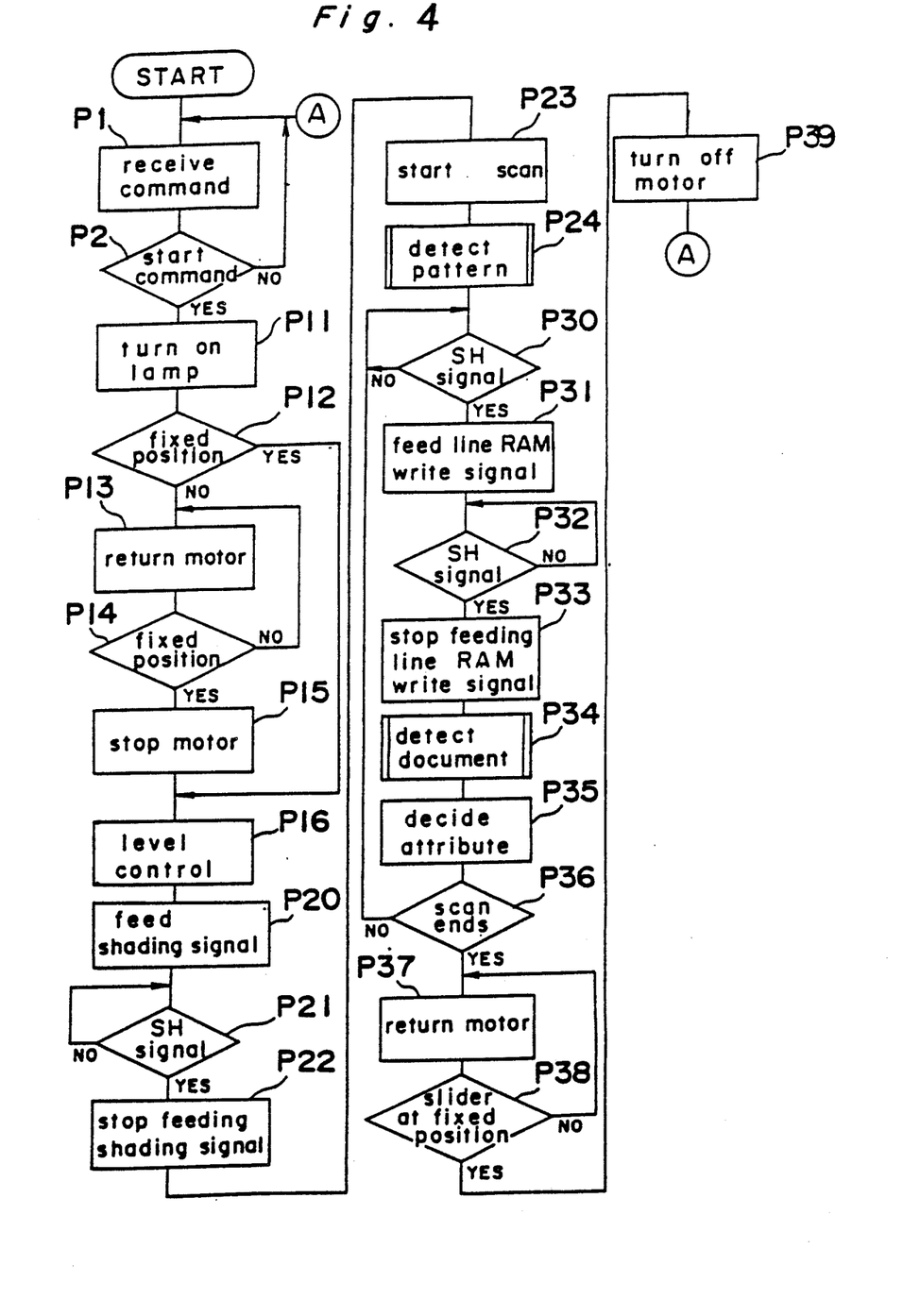
FIG. 4 is a flow chart of a main routine for controlling the image reader.

FIG. 4 shows a flowchart of a scan. If the start command is received (steps P1, P2), a following scan action starts, wherein the magnification and other parameters of the scanner have been set according to operating conditions.

Then, the exposure lamp 2 is turned on (step P11). Next, it is decided whether the scanner has returned to a predetermined fixed position or not (step P12). If the decision is yes, the program goes to step P16. If not, the scan motor is driven so that the scanner is moved in the return direction to the fixed position (step P13) until the scanner locates at the fixed position (step P14). Then, the scan motor is stopped (step P15).

Then, the level of CCD 20 is controlled (step 16).

Next, the shading process starts. Because the slider is located at the fixed position, the shading signal is fed (step P20). After a sample-hold (SH) signal as the synchronizing signal of the output of the image sensor 20 is received (step P21), the shading signal is stopped (step P22), and a scan is started (step P23).

Then, the reference edge of the pattern of the plate 7 is detected (step P24), as will be explained later.

After an SH signal is received (step P30), the output voltage of the image sensor 20 corrected for the shading is written in the line RAM 50 (step P31). Next, after an SH signal is received (step P32), the write signal to the line RAM 50 is stopped (step P33), and a document is detected from the data written in the line RAM 50 (step P34). Next, it is decided whether the attribute of the data processing is bi-level or dither from the data written in the line RAM 50, and the results of the decision are written in the selector 52 (step P35). Then it is decided whether the scan ends or not (step P36). If the decision is yes, the motor is driven in the return direction (step P37) until the scanner returns to the fixed position (step P38). After the motor is turned off (step P39), the flow returns to step P1 of the main routine, and the next start command is awaited.

(c) Detection of the top edge of the pattern

The reference edge 7f of the plate is detected by using a black pattern 7c drawn on the rear surface of the plate 7, as shown in FIG. 2. The rear surface of the plate 7 is scanned in the subscan direction shown by an arrow in FIG. 2. The point where the output signal of CCD changes from black to white after it changes from white to black on the scan across the black pattern 7c is determined as the boundary of the black pattern 7c at the side of the document 6. Then, the reference edge 7f of the plate 7 or the top edge of the document area is determined by adding a known distance between the boundary and the edge 7f to the boundary position. Therefore, the scan of the document area will start from the edge 7f. In order to detect the change of the level of the density from white to white via black, both sides of the black pattern 7c are made white.

Figure 5:
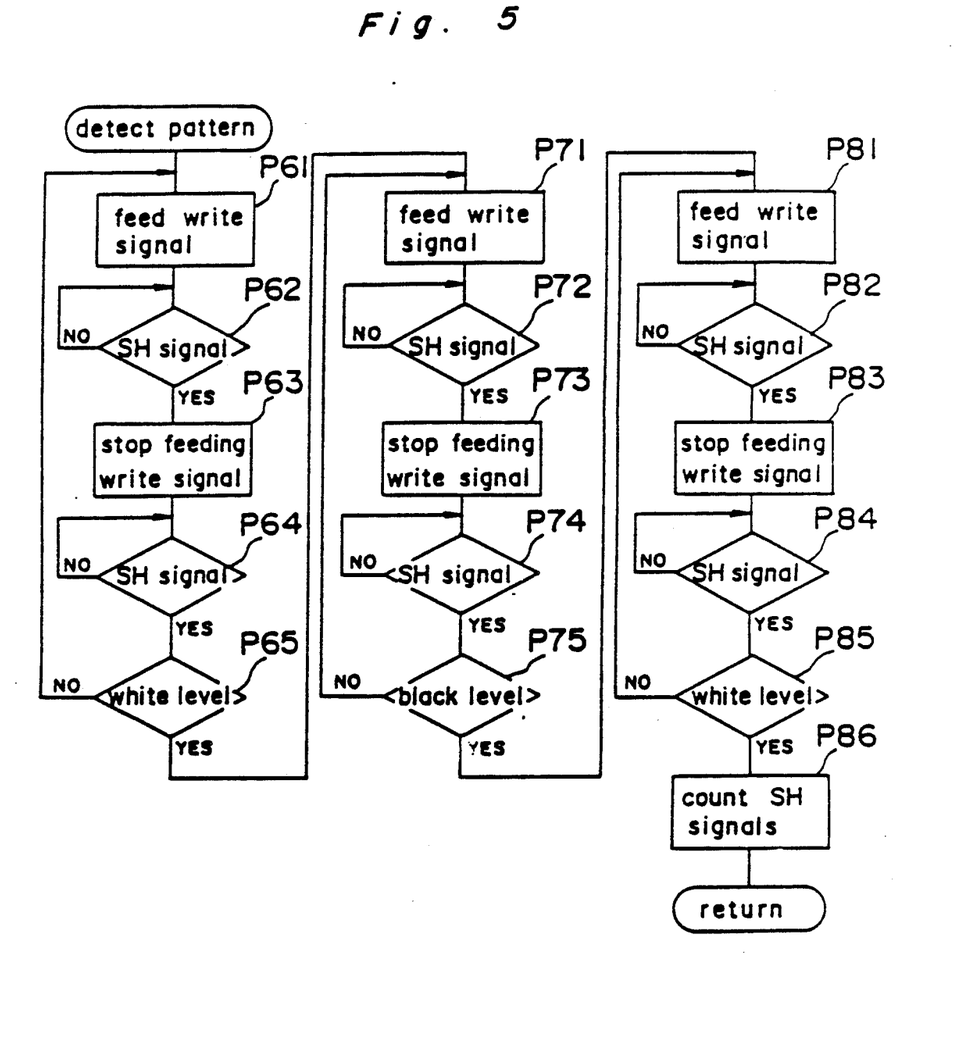
FIG. 5 is a flow chart of a subroutine for the detection of a pattern.

FIG. 5 shows a flow of the detection of the reference edge of the plate 7. After the start of the scan (step P23 in FIG. 4), the output signal of one or more pixels in the one-dimensional CCD 20 which locates in a position favorable to the detection of the black pattern 7c is detected by CPU 42 every time an SH signal is received from the clock generator 40. The shading has already been corrected (steps P20–P22).

First, the line RAM write signal is fed again (step P61), and the output signal of CCD 20 is written in line RAM 50. After an SH signal is received from the clock generator 40 (step P62), the line RAM write signal is stopped (step P63), and a next SH signal is waited for (step P64). Subsequent to the next SH signal the level of the pixel is read, and it is decided whether the level is the white level or not (step P65). This process is repeated until the white level is detected. If the white level is detected, it is decided that CCD is located in the white part 7a. The line RAM write signal is fed (step P71), and the output signal is written in line RAM 50. After an SH signal is received from CCD (step P72), the line RAM write signal is stopped (step P73), and a next SH signal is waited for (step P74). Subsequent to the next SH signal, the level of the pixel at the predetermined position in CCD 20 is read, and it is decided whether the level is the black level or not (step P75). This process is repeated till the black level is detected. If the black level is detected, it is decided that CCD 20 is located at the black pattern 7c.

Next, the line RAM write signal is fed again (step P81), and the output signal is written in line RAM 50. After an SH signal is received from CCD 20 (step P82), the line RAM write signal is stopped (step P83); and a next SH signal is waited for (step P84). Then the level of the pixel is read, and it is decided whether the level is the white level or not (step P85). This process is repeated until the white level is detected. If the white level is detected, it is decided that CCD 20 is located on the boundary of the black pattern 7c at the side of the document 6.

Then, a predetermined number of SH signals are counted (step P86) or a predetermined length is passed, and the reference edge 7f of the plate 7 is found.

(d) Detection of image area

An image area which contains information such as characters and figures in a document is detected in this embodiment (step P34 in FIG. 4). Thus, even if a document is not placed in a regular area on the platen glass 4, the whole document can be read. The location of the edge of a document is detected as the point where the density changes from the white level to the black level.

The detection method which will be explained in the following makes it possible to detect a document correctly even when a document cover is open so that the surrounding area of the document is detected as a black frame.

The detection will be explained with reference to an example shown in FIG. 2. where a large Roman character "A" is drawn on a document 6. In this embodiment, an image area is detected as the narrowest rectangle which encircles the information, that is, "A", as shown by dashed lines a-d in a document 6. The dashed line (left edge) a and the dashed line (right edge) b perpendicular to the main scan direction make contact with the furthest left point $A_1$ of the character A and with the furthest right point $A_2$ thereof, respectively. The dashed line (top edge) c and the dashed line (bottom edge) d parallel to the main scan direction make contact with the highest point $A_3$ of the character A and the lowest points $A_1$ and $A_2$ thereof, respectively. The boundaries a,b,c and d of the image area are parallel or perpendicular to the main scan direction because a document 6 is detected linearly in the main scan direction by CCD 20. An image area is detected by CCD 20 by moving the scan position of CCD 20 successively from the top edge 7f to the bottom of the document area in the subscan direction.

Figure 6A:
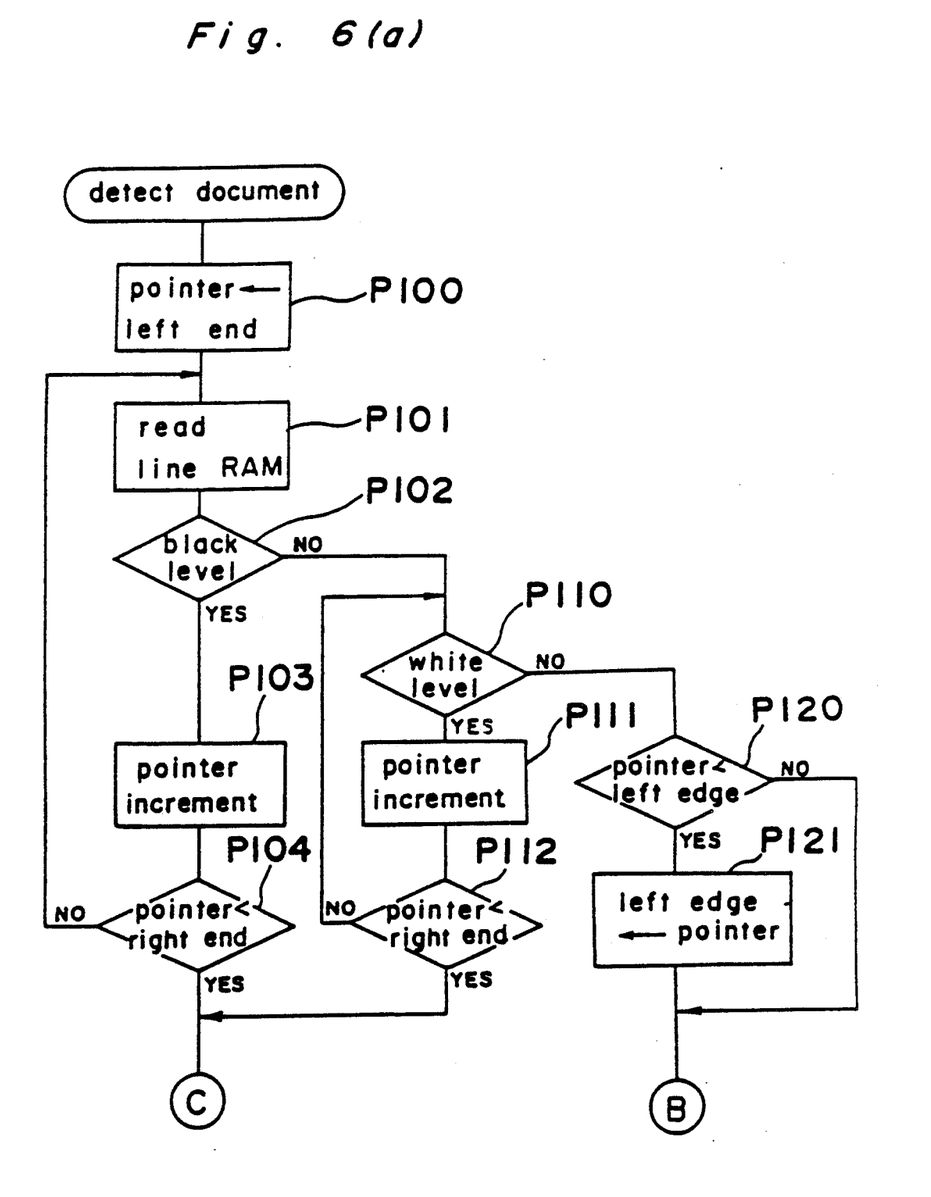
FIGS. 6(a), (b) are flow charts of a subroutine for the detection of a document.
Figure 6B:
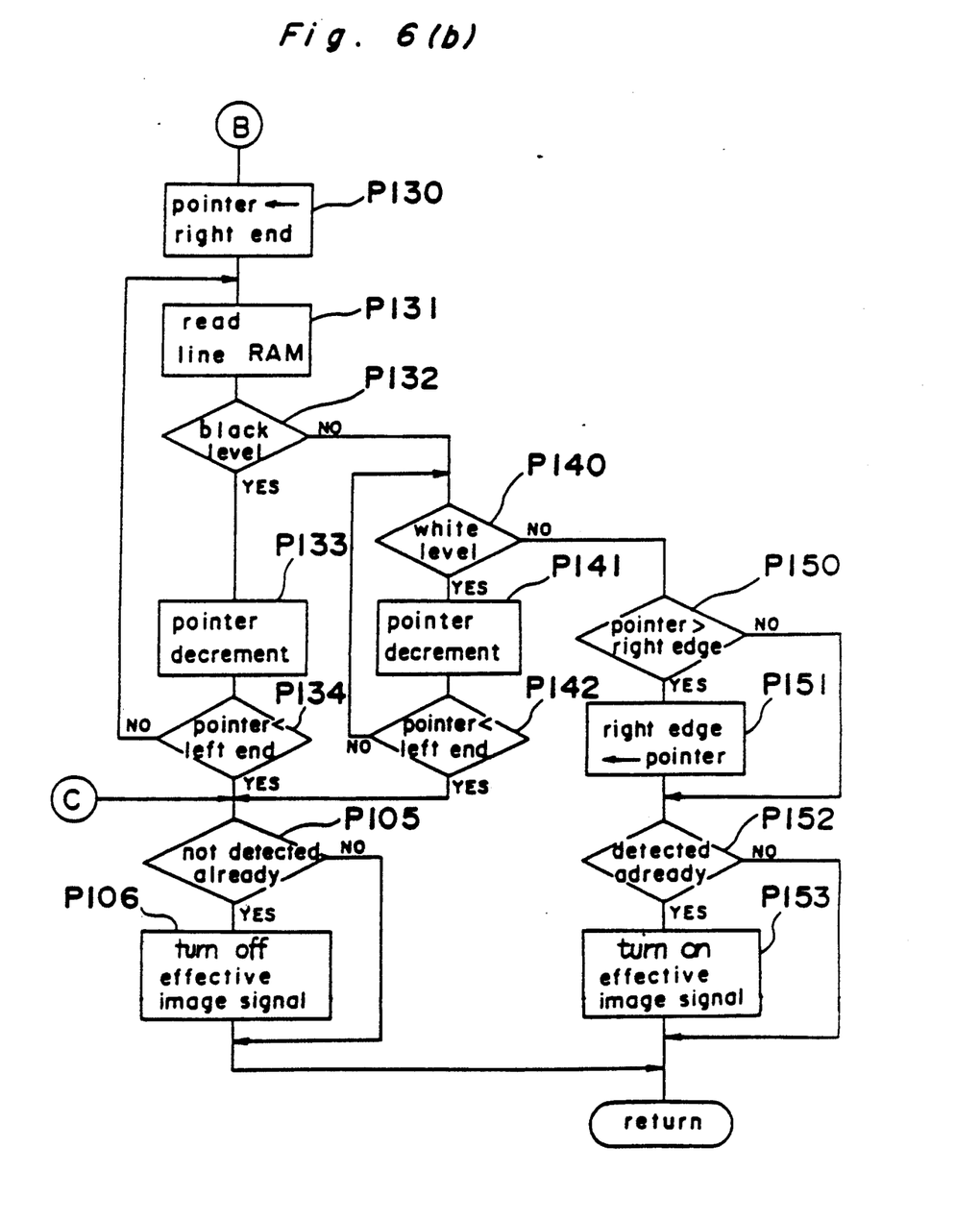

FIGS. 6(a),(b) shows a flow of the detection of the image area by using the data stored in line RAM 50 in the subscan. The flow is repeated per each main scan through subscanning.

First, a pointer for the read of the data of CCD 20 is located at the top position (left end position) (step P100). The left edge of the image and the right edge thereof are also set as the initial values, that is, the top and bottom positions of the pixel of CCD 20.

Next, the data of the pixel which is designated by the pointer is read (step P101), and it is decided whether the data is the black level or not (step P102). If the data is the black level, no image is detected so that the pointer is renewed to the next position to the right (step P103). Then, it is decided whether the pointer exceeds the right end position (step P104). If the decision is no, the program returns to step P101. If the decision is yes, no image is contained in the main scan. Then, it is decided whether any image is detected in the previous scans or not (step P105). If the previous scans detect any image, the present scan position is determined as the bottom edge (step P106). If the decision is no, the program returns to the main program.

If it is decided in step P102 that the data is not the black level, it is decided next whether the data is the white level or not (step P110). If the data is the white level, the pointer is renewed to the next position to the right (step P111). Then, it is decided whether the pointer exceeds the right end position (step P112), and if the decision is no, the program returns to step P110. If the pointer exceeds the right end position, the program goes to step P105. This process is repeated till the black level is detected.

If it is decided in step P110 that the data is not the white level but the black level, it is decided next whether the pointer is smaller than the left edge of the image determined in previous scans (step P120). If the pointer is smaller than the left edge, the left edge is renewed as the present position of the pointer, that is, the position that the black level is detected again. Thus, the left edge of the image is detected. If the decision is no in step P120, the program goes to step P130 in order to detect the right edge.

First, the pointer is located at the bottom end (the right end position) of the pixel in CCD 20 (step P130), and the data of the pixel is read (step P131). Then, it is decided whether the data is the black level or not (step P132). If the data is the black level, no image is detected so that the pointer is renewed to the next position to the left (step P133). Then, it is decided whether the pointer exceeds the left end position (step P134). If the decision is no, the program returns to step P131. If the decision is yes, no image is contained in the main scan. Then, it is decided whether an image is detected in the previous scans or not (step P105). If the previous scans detect an image, the present scan position is determined as the bottom edge, so that the effective image signal is turned off (step P106). If the decision is no, the program returns to the main program.

If it is decided in step P132 that the data is not the black level, it is decided next whether the data is the white level or not (step P140). If the data is the white level, the pointer is renewed to the next position to the left (step P141). Then, it is decided whether the pointer exceeds the left end position (step P142), and if the decision is no, the program returns to step P140. If the pointer exceeds the left end position, the program goes to step P105. This process is repeated until the black level is detected.

If it is decided in step P140 that the data is not the white level but the black level, it is decided next whether the pointer is smaller that the right edge of the image determined in the previous scans (step P150). If the pointer is smaller than the right edge, the right edge is renewed as the present position of the pointer, that is, the position that the black level is detected again. Thus, the right edge of the image is detected. If the decision is no in step P150, no image is contained in the main scan, and the program goes to P152. Then, it is decided whether an image is detected in the previous scans or not (step P152). If an image is detected first the present scan position is determined as the top edge, so that the effective image signal is turned on (step P153). If the decision is no, the program returns to the main program.

Thus, the top edge of a document region can be detected on a subscan across a black pattern drawn on a pattern plate, with reference to a point where the detected level of density changes to the white level again.

Therefore, a document-top-edge-switch used in a prior art image reader is not required. Further, the precise location of a document scale may be flexible whereas the location of a pattern plate should be correct.

The preferred embodiments described herein are illustrative and not restrictive, the scope of the invention being indicated by the appended claims and all variations which come within the meanings of the claims ar intended to be embraced herein.

What is claimed is:

1. An image reader comprising:
   a platen on which a document is placed:
   means for reading a linear optical image and for outputting image signals corresponding to the read image;
   means for moving said reading means in a subscan direction which is perpendicular to the linear optical image so that an image of the document is scanned by the reading means;
   criterion member on which a criterial mark is formed, said criterion member being arranged at an upstream side of the platen with respect to the subscan direction to form a prescribed positional relationship between the criterial mark and the platen, whereby said reading means successively reads the criterial mark and the image of the document;
   means for determining, according to when the criterial mark is read and according to said prescribed positional relationship, a reference timing for starting the scanning of the document on the platen;
   means for measuring the timing to determine the expiration of the reference timing;
   means responsive to the expiration of the reference timing for starting an image reading process;
   determining means for automatically determining the boundaries of an actual image area on the document by distinguishing the portion of the document where actual images are present from the portion of the document where no actual images are present during the image reading process, according to the image signals outputted by the reading means, in order to detect the actual image area of the document which is to be outputted; and
   means for sending effective image signals corresponding to the image area out to the exterior when the image area is detected.

2. An image reader according to claim 1, wherein said determining means fixes the reference timing to be equal to the time necessary for moving said reading means from the criterial mark to an edge of the platen.

3. An image reader according to claim 1, wherein said criterial mark has at least one black zone and at least one white zone which are formed next to each other in the subscan direction with said white zone being positioned downstream from the black zone with respect to the subscan direction, said determining means detecting a boundary between the black and white zones and fixing the reference time to be the time necessary for the reading means to move from the boundary to the edge of the platen.

4. An image reader comprising:
   a platen on which a document is placed at a predetermined position;
   a standard member provided on a side of the platen, the document being placed along a side of the member;
   a criterial mark arranged near the platen and arranged on the same side as the side on which the standard member is provided;
   a line image sensor for detecting the criterial mark and for reading a linear optical image of the document;
   means for moving said sensor along the platen from said side of the platen in a direction perpendicular to the linear optical image, said line image sensor detecting the criterial mark and scanning the image of the document in the same scan operation;
   means for controlling the sensor to start the reading of the image once the sensor has moved a predetermined distance after the detection of the criterial mark, said predetermined distance being substantially equal to the distance between an edge of the criterial mark and said side of the standard member along which the document is to be placed;
   determining means for automatically determining the boundaries of an actual image area on the document by distinguishing, according to image information obtained by the scanning operation of the document image, only the portion of the document where actual images are present, a color of the actual images being different from a color of a background in the document;
   means for extracting effective image information located within said boundaries as determined by said determining means; and means for transferring the effective image information out of said image reader.

5. A method for reading an image of a document through a single scanning operation in an apparatus having a platen on which a document is placed, a standard member having a side along which the document is to be placed, a line image sensor for scanning an image of the document by movement along the platen and for outputting image signals corresponding to the image, and a criterial mark arranged at the upstream side of the platen with respect to the moving direction of the line image sensor, said method comprising the steps of:

detecting the criterial mark by said line image sensor;

reading the image of the document, said reading step being started once the line image sensor has moved a predetermined distance after the detection of the criterial mark, said predetermined distance being substantially equal to the distance between an edge of the criterial mark and the side of the standard along which the document is to be placed;

examining image information obtained by said reading operation to determine the boundaries of the actual image area by distinguishing the portion of the document where actual images are present from the portion of the document where no actual images are present;

extracting effective image information located within said boundaries and corresponding to said portion of the document where actual images are present; and transferring the effective image information out of said image reader.

6. An image reader comprising:

a platen on which a document is placed at a predetermined position;

a standard member provided on a side of the platen, the document being placed along a side of the member;

a criterial mark arranged near the platen and arranged on the same side as the side on which the standard member is provided;

a line image sensor for detecting the criterial mark and for reading a linear optical image of the document;

means for moving said sensor along the platen from said side of the platen in a direction perpendicular to the linear optical image, whereby said sensor detects the criterial mark and scans the image of the document during a one scan operation;

means for controlling the sensor to start the reading of the image once the sensor has moved a predetermined distance after the detection of the criterial mark, said predetermined distance being substantially equal to the distance between an edge of the criterial mark and said side of the standard member along which the document is to be placed;

determining means for determining boundaries of an actual image area on the document by distinguishing, according to image information obtained by the scanning operation of the document image, the portion of the document where actual images are present from the portion of the document where no actual images are present;

means for sending out linear image information located within said boundaries and determined by said determining means which corresponds to the portion of the document where actual images are present; and means for forbidding said sending means to send linear image information if the linear image information has no actual image information.

7. An image reader according to claim 6, further comprising means for storing said linear image information and means for judging whether the image information stored by said storing means includes an actual image or not, said forbidding means forbidding the sending means from sending the linear image information in accordance with the judgement by said judging means.

8. An image reader according to claim 6, wherein said forbidding means forbids the sending of linear image information which includes no black image information.

9. An image reader according to claim 6, wherein said forbidding means forbids the sending of linear image information which corresponds to an area of said platen in which the document is absent.

10. An image reader according to claim 6, wherein said forbidding means forbids the sending of linear image information which includes no white image information.

11. The image reader according to claim 1, wherein the position of the criterion member is fixed with respect to the platen.

12. The image reader according to claim 1, wherein said determining means distinguishes the portion of the document where actual images are present from the portion of the document where no actual images are present based on changes in density between the actual image itself and a background of the document.

13. The image reader according to claim 4, wherein the position of the criterion member is fixed with respect to the platen.

14. The image reader according to claim 4, wherein said determining means distinguishes the portion of the document where actual images are present from the portion of the document where no actual images are present based on changes in density between the actual image itself and the background of the document.

15. The method according to claim 5, wherein said step of determining the boundaries of the actual image area is carried out by automatically detecting differences in density between the actual image itself and a background of the document.

16. The image reader according to claim 6, wherein the position of the criterion member is fixed with respect to the platen.

17. The image reader according to claim 6, wherein said determining means distinguishes the portion of the document where actual images are present from the portion of the document where no actual images are present based on changes in density between the actual image itself and a background of the document.

* * * * *